United States Patent Office 3,062,892
Patented Nov. 6, 1962

3,062,892
ONE STEP SYNTHESIS OF VINYL ETHERS AND VINYL SULFIDES
Henry J. Schneider, Hatboro, Pa., assignor to Rohm & Haas Company, Philadelphia, Pa., a corporation of Delaware
No Drawing. Filed Aug. 1, 1960, Ser. No. 46,357
14 Claims. (Cl. 260—609)

This invention relates to a novel process for the preparation of vinyl ethers and vinyl sulfides of the general structure

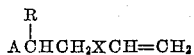

wherein X is oxygen or sulfur, A represents a variety of functional groups such as hydroxy or alkoxy, and R represents H or an alkyl, aralkyl or aryl moiety.

The process involves the simultaneous reaction of acetylene and an alkylene oxide with an appropriate substrate such as aqueous or alcoholic sodium or potassium hydrosulfide, and lower alkanols such as methanol or t-butanol, as shown in the following equations, where ethylene oxide is used as an example:

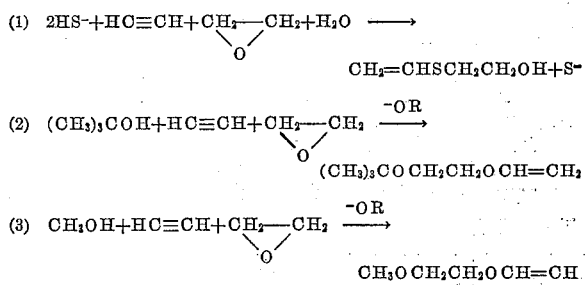

The key to the unique "one-step" process is the blocking action of acetylene in the reaction. To illustrate, when ethylene oxide is introduced into methanolic methoxide at elevated temperatures, the predominant reaction is the base-catalyzed polymerization of the ethylene oxide. However, if acetylene is present as in the method of this invention, the intermediates in the polymerization can be intercepted by the formation of the vinyl ether. By this means it is possible, for example, to make a vinyl terminated polyethylene oxide of any desired ethylene oxide content. The blocking action of acetylene is even more strikingly illustrated when sodium hydrosulfide is employed in the "one-step" synthesis. The addition of ethylene oxide to sodium hydrosulfide solution results in the formation of an intermediate hydroxyethyl mercaptide and ultimately thiodiglycol is obtained as the major product. However, when acetylene is present in the reaction the intermediate hydroxyethyl mercaptide is intercepted and the major product obtained is 2-hydroxyethyl vinyl sulfide.

The prior art has known of alkoxyalkyl vinyl ethers, generally having prepared them by the direct vinylation of an alkoxyalkanol with acetylene in the presence of basic catalysts through techniques devised by Reppe in Germany (and described by Copenhaver and Bigelow in "Acetylene and Carbon Monoxide Chemistry," Reinhold Publishing Company, New York, 1949, pages 38, 39 and 86). In essence, that method is as follows: A reaction vessel is packed with nitrogen, then a catalyst solution is introduced and is heated to reaction temperature. Next, the circulation of the nitrogen is started and excess alcohol is distilled off. When the required catalyst concentration is reached, acetylene is introduced until the desired acetylene-nitrogen ratio is attained. Acetylene, the alcohol and the catalyst solution are then added at prescribed rates, and vinylation takes place. Following this procedure, when ethylene oxide is introduced to sodium hydrosulfide and the condensate is then reacted with acetylene, the yields are rather poor and altogether unsatisfactory. The results are in sharp contrast with those achieved by the process of this invention.

According to the present invention, when ethylene oxide is pumped into an alcohol containing a catalytic amount of alkoxide ion maintained at elevated temperatures under acetylene pressure, the resulting products are a mixture of vinyl ethers of the parent alcohol and ethylene oxide addition products thereof, the ratios of the separate products being dependent upon the processing conditions employed. The reaction is typified by Equations 2 and 3 above, the oxide being introduced into the alcohol so that the alcohol/oxirane ratio is greater than unity at all times. In each case the vinyl ethers are accompanied by small amounts of their parent alcohols. In this reaction it appears that formation of the Cellosolve vinyl ethers involves the initial formation of the substituted ethoxide immediately followed by vinylation. In this way the acetylene intercepts the substituted ethoxide ion which would be capable of reacting further with ethylene oxide to form a carbitol. At the same time, the starting alcohol will compete for acetylene with the alkoxy Cellosolve, carbitol, etc., producing alkyl vinyl ethers as illustratively shown in Table 1 which follows:

TABLE 1

*Distribution of Products (Crude) in Base-Catalyzed Reaction of Alkanol, Ethylene Oxide and Acetylene*

| Component | Conversion of ethylene oxide to— | Conversion of Alcohol to— | Percent yield, based on unrecovered alcohol |
|---|---|---|---|
| A. Alkanol was t-butanol: | | | |
| $t\text{-}C_4H_9OCH_2CH_2OCH=CH_2$ | 23.6 | 18.8 | 46.9 |
| $t\text{-}C_4H_9(OCH_2CH_2)_2OCH=CH_2$ | 24.4 | 9.7 | 24.2 |
| $t\text{-}C_4H_9(OCH_2CH_2)_3OCH_2=CH_2$ | 12.9 | 3.4 | 8.5 |
| | 60.9 | 31.9 | 79.6 |
| B. Alkanol was methanol: | | | |
| $CH_3OCH_2=CH_2$ | | 39.4 | 45.6 |
| $CH_3OCH_2CH_2OCH=CH_2$ | 32.3 | 20.1 | 22.9 |
| $CH_3(OCH_2CH_2)_2OCH=CH_2$ | 20.0 | 6.2 | 7.1 |
| $CH_3(OCH_2CH_2)_3OCH=CH_2$ | 8.1 | 1.7 | 1.9 |
| $CH_3OCHCH_2OH$ | 4.6 | 2.9 | 3.3 |
| $CH_3(OCH_2CH_2)_2OH$ | 1.4 | 0.4 | 0.5 |
| | 66.4 | 70.7 | 81.3 |

The method of preparing the alkoxyalkyl vinyl ethers is illustratively shown in Examples 1 and 2 which follow:

EXAMPLE 1

Ethylene oxide (44 g., 1.0 mole) in t-butanol (50 g., 0.675 mole) was pumped slowly (6 cc. 1 mm.) over a 20 minute period into a solution of potassium t-butoxide (11 g., 0.1 mole) in t-butanol (43 g., 0.58 mole) held at 125° C. under acetylene pressure (350–500 p.s.i.). The reaction was extremely exothermic and the temperature rose rapidly to 174° C., and acetylene (22 g., 0.85 mole) was absorbed.

The homogeneous reaction mixture was flash distilled to give a clear distillate (137 g., B.R. 110° C./1.5–2 mm., pot temp. <150° C.) and a dark, semi-solid residue (26 g.). The expected residue, calculated as potassium t-butoxide was 11.3 g. The flash off distillate was rectified to give various fractions. One was pure 2-(t-butoxy)ethyl vinyl ether $d_{25}^{25}$ 0.8535), its elemental analysis being:

Calc. for $C_6H_{16}O_2$: C, 66.67; H, 11.11; eq. wt., 144;

$M_D$, 41.96. Found: C, 66.80; H, 11.51; eq. wt. ($CH_2=CH-$), 150; $M_D$, 42.45.

Another fraction, selected as the heart cut was 2-(t-butoxyethoxy)ethyl vinyl ether ($n_D^{20}$ 1.4304, $d_{20}^{20}$ 0.9143; $d_{25}^{25}$ 0.9137), its elemental analysis being:

Calc. for $C_{10}H_{20}O_3$: C. 63.79; H, 10.71; eq. wt., 188; $M_D$, 52.84. Found: C, 63.78; H, 10.80; eq. wt. ($CH_2=CH-$), 188; $M_D$, 53.14.

EXAMPLE 2

Ethylene oxide (247 g., 5.61 moles) was pumped over a period of 1.5 hours into a solution of potassium metal (39.1 g., 1.0 mole) in methanol (320 g., 10.0 moles) contained in a 1-liter stirred autoclave. The reaction was extremely exothermic; the temperature rose rapidly from 123° C. to 169° C. during the first 20 minutes. The cooled reaction product (68 g.) containing absorbed acetylene (81 g., 3.1 moles), was flash distilled to give a clear distillate (468 g., B.R. <79° C./6 mm.; pot temp. <202° C.) leaving a dark brown, water soluble residue which was discarded. The principal product (173 g.) was an azeotrope of 2-methoxyethyl vinyl ether and the parent alcohol, methyl Cellosolve, analysis showed that there was 89.6% vinyl ether and 11.5% of alcohol. The second major product (80 g.) was an azeotrope of 2-methoxyethoxyethyl vinyl ether and the parent methyl carbitol. Analysis showed the composition to consist of 94.4% vinyl ether and 5.6% alcohol. Redistillation over sodium metal resulted in pure 2-(2-methoxyethoxy)-ethyl vinyl ether, $n_D^{25}$ 1.4266; $n_D^{20}$ 1.4289; $d_{25}^{25}$ 0.9554; $d_{20}^{20}$ 0.9552. The elemental analysis of this composition proved to be:

Calc. for $C_7H_{14}O_3$: C, 57.71; H, 9.65; eq. wt., 146; $M_D$, 38.99. Found: C. 57.21; H, 9.52; eq. wt., ($CH_2=CH$)—, 143; $M_D$, 39/38.

The method of preparing 2-hydroxethyl vinyl sulfide is illustratively shown in Examples 3 and 4 which follow:

EXAMPLE 3

(a) *Using a one-pump system.*—Aqueous (ca. 50% sodium hydrosulfide (2.0 moles) was charged to a 1-liter stirred autoclave and washed with a small quantity of water (ca. 50 cc.). The system was flushed with nitrogen and acetylene and heated with stirring to 110° C. Acetylene was then pressed into the autoclave to 450–500 p.s.i.g. An aqueous solution of ethylene oxide (1.0 mole/150 cc. water) was then introduced by means of a positive displacement pump over a period of 18–30 minutes. The reaction was exothermic and temperature was maintained by appropriate intermittent cooling. As acetylene was absorbed by the reaction, additional acetylene was added intermittently from a calibrated reservoir to return the pressure in the autoclave to 450–500 p.s.i.g. The two-phase reaction mixture was then cooled to room temperature and discharged from the autoclave. The oil layer was separated, the water layer extracted with ether, and the combined oil layers flash-distilled into a Dry-Ice acetone cooled receiver. The flash-distillate was then rectified on an eighteen inch Vigreux column to recover 2-hydroxyethyl vinyl sulfide.

This experiment was run a number of times with minor modifications. In some instances a water solvent was employed only for the sodium hydrosulfied. In other instances water solvents were employed for both the sodium hydrosulfide and the ethylene oxide as in the above example. In still other instances methanol solvents were used for both the sodium hydrosulfide and the ethylene oxide. Details of the various experiments are set forth in Table II below.

(b) *Using a two-pump system.*—Separate streams of an aqueous ethylene oxide solution (1.0 mole/140 cc.

TABLE II

*Summary of "One-Step" Synthesis of 2-Hydroxyethyl Vinyl Sulfide*

ONE-PUMP SYSTEM-WATER SOLVENT FOR NaHS

| Reactants | | | | Conditions | | | | Product | |
|---|---|---|---|---|---|---|---|---|---|
| NaSH | | Ethylene oxide | | $C_2H_2$, absorbed moles [2] | Time [1] P | Hrs. T | Temp., °C. | HEVS, moles | Yield, HEVS |
| Moles | Percent solution | Moles | Percent solution | | | | | | |
| 2.84 | 47.4 | 2.84 | -------- | 6.12 | 0.5 | 4.0 | 132– 53 | -------- | ------ |
| 3.11 | 47.4 | 3.11 | -------- | 2.35 | 0.5 | 0.95 | 95–146 | a 0.79 | 32 |
| 3.05 | 27.2 | 1.52 | -------- | 3.96 | 0.26 | 0.92 | 115– 31 | 0.66 | 44 |

ONE-PUMP SYSTEM-WATER SOLVENT FOR NaHS AND E. O.

| 2.0 | 47.4 | 1.0 | 22.6 | 3.81 | 0.5 | 1.5 | 108– 32 | 0.40 | 40 |
|---|---|---|---|---|---|---|---|---|---|
| 2.0 | 47.4 | 1.0 | 22.6 | 0.77 | 0.3 | 0.3 | 108– 30 | 0.35 | 35 |
| 3.0 | 30.1 | 0.75 | 22.6 | 1.92 | 0.16 | 1.4 | 106– 28 | 0.29 | 33 |
| 3.0 | 30.1 | 0.75 | 22.6 | 0.85 | 0.28 | 0.28 | 105– 28 | 0.27 | 36 |

ONE-PUMP SYSTEM-METHANOL SOLVENT FOR NaHS AND E. O.

| 1.55 | 28.2 | 1.55 | -------- | 2.19 | 0.5 | 1.4 | 110– 30 | 0.40 | 26 |
|---|---|---|---|---|---|---|---|---|---|
| 2.0 | 27.6 | 1.0 | 27.2 | 3.35 | 0.5 | 0.97 | 105– 32 | 0.43 | 43 |

TWO-PUMP SYSTEM-WATER SOLVENT-WATER-BOTTOMS [3]

| 2.0 | 47.2 | 1.0 | 22.9 | 0.0 | 0.62 | 0.62 | 79– 89 | -------- | ------ |
|---|---|---|---|---|---|---|---|---|---|
| 2.0 | 47.2 | 1.0 | 24.2 | 0.35 | 0.62 | 0.62 | 96–106 | 0.41 | 41 |
| 2.0 | 47.2 | 1.0 | 24.7 | 1.0 | 0.60 | 0.60 | 104– 27 | 0.47 | 47 |
| 2.0 | 47.2 | 1.0 | 24.2 | 3.1 | 0.58 | 0.58 | 135– 56 | 0.53 | 53 |
| 2.0 | 47.6 | 1.0 | 24.7 | 1.46 | 0.72 | f 0.83 | 104– 30 | 0.50 | 50 |
| 2.0 | 47.2 | 1.0 | 24.7 | 1.31 | 0.21 | 0.21 | 107– 24 | 0.43 | 43 |
| 2.0 | 47.2 | 1.0 | 24.7 | 1.27 | 0.20 | 0.20 | 115– 32 | 0.48 | 48 |

TWO-PUMP SYSTEM-WATER SOLVENTS-DIOXANE BOTTOMS [4]

| 2.0 | 47.6 | 1.0 | 22.6 | 1.46 | 0.73 | f 0.87 | 110– 31 | 0.54 | 54 |
|---|---|---|---|---|---|---|---|---|---|
| 2.0 | 43.3 | 1.0 | 22.0 | 1.31 | 0.23 | 0.23 | 121– 31 | 0.47 | 47 | water) and aqueous (47.2%) sodium hydrosulfide (2.0 moles) were pumped into a 1-liter autoclave containing water (100 cc.) at 110° C. under acetylene pressure (450–500 p.s.i.g.) over a period of 30 minutes. The pumps and solution concentrations were adjusted so that the rates would always be in the ratio 2 moles NaHS/1 mole ethylene oxide. The reaction was exothermic and was controlled at 120–130° C. by cooling as required. When the desired quantities of reagents had been added, the reactor was cooled and the two-phase reaction system withdrawn.

The workup and isolation of 2-hydroxyethyl vinyl sulfide was similar to that described for the "one-pump" system in Example 3(a) above. This experiment was also run a number of times with minor modifications, such as using water bottoms in some cases and dioxane bottoms in others. Details of the various experiments are set forth in Table II.

EXAMPLE 4

A solution (0.005 mole/ml.) of propylene oxide (58.5 g., 1.0 mole) in dioxane (133 g.) and aqueous sodium hydrosulfide (0.105 mole/ml.) were pumped at equal rates into a heated 1-l. autoclave containing a water heel (150 ml.) under acetylene pressure (400–500 p.s.i.g.) over a period of 16 minutes. The reaction was exothermic and temperature was maintained at 121–129° C. by water cooling. Acetylene (29 g., 1.11 moles) was absorbed. When addition of reagents was complete, the reactor was cooled immediately to room temperature.

The organic layer (254 g.) was flash-distilled to give a clear distillate (234 g., B.R. <103° C./0.42 mm.; pot temp. <160° C.) and a brown, solid residue (18 g.) which was discarded.

The dioxane was removed in vacuo and 2-hydroxypropyl vinyl sulfide (65 g., 0.55 mole, 55% yield) was recovered as a colorless liquid, B.R. 65–67° C./9.5 mm., $n_D^{25}$, 1.5057.

Further experimentation with the various modes of operating the present invention has led to the following observations. The two-pump system is more advantageous than the one-pump system, with as much as 130% more hydroxyalkyl vinyl sulfide or ether being obtained in comparison with the former technique, all other conditions being the same. Another advantage lies in the fact that the non-distillable residues are sharply reduced. A continuous process, in which the hydroxyalkyl vinyl ether or sulfide is removed as rapidly as it is formed, is even more efficient as it minimizes destruction of the desired product.

When sodium hydrosulfide or sodium hydroxide is used, 50% solutions can readily be obtained. Sodium sulfide will dissolve in water to give only a 25% solution. The amount of water needed to maintain a homogeneous system at room temperature is 225–250 cc./mole of sodium sulfide. The more dilute solution generally is preferred for addition to the one-pump system, and the more concentrated solution is preferred for addition to the two-pump system. The remaining required water then is introduced along with the ethylene oxide.

Water is the preferred solvent for the reaction. The use of acetylene solvents, such as methanol or dioxane, is satisfactory but appears to offer no significant advantages. An additional advantage to the use of water is in the ease of separation of the reaction product. The materials charged to the reaction are all completely water soluble. The reaction products are in two phases since the product, 2-hydroxyethyl vinyl sulfide, is relatively insoluble in water.

Still other variations, all within the purview of the present invention, will be apparent to those skilled in the art from a review of the foregoing disclosure. For example, in lieu of the one or two-pump systems there may be even more pumps employed. Accordingly, the invention will be understood to be broad, and is limited in scope only by the definitions in the claims which follow.

I claim:

1. A process for preparing vinyl ethers and vinyl sulfides of the formula

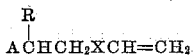

which comprises simultaneously reacting acetylene and an alkylene oxide of the formula

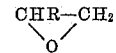

with an appropriate substrate from the group consisting of aqueous and alcoholic sodium and potassium hydrosulfide solutions and aqueous alcoholic solutions of lower alkanols containing a catalytic amount of alkali metal alkoxide, the A in the first formula being a functional group from the class consisting of hydroxy and alkoxy groups, the R in both formulae being a functional group from the class consisting of H and alkyl, aralkyl and aryl moieties, and X being an element from the class consisting of oxygen and sulfur, and the ratio of sulfide to oxirane being at least equal to unity and the ratio of alcohol to oxirane being greater than unity.

2. A process for preparing vinyl sulfides of the formula

which comprises simultaneously reacting acetylene and an alkylene oxide

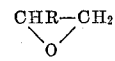

with an appropriate substrate from the group consisting of sodium and potassium hydrosulfides, the A in the first formula representing a functional group from the class consisting of hydroxy and alkoxy groups, and the R in both formulae representing a functional group from the class consisting of H and alkyl, aralkyl, and aryl moieties.

3. A process for preparing vinyl ethers of the formula

which comprises simultaneously reacting acetylene and an alkylene oxide of the formula

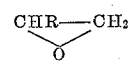

with a lower alkanol containing a catalytic amount of an alkali metal alkoxide, the A in the first formula being an alkoxy group, and the R in both formulae being a functional group from the class consisting of H and alkyl, aralkyl and aryl moieties.

4. The process of claim 2 in which solutions of the alkylene oxide and of the hydrosulfide are fed in separate multiple streams into the reactor containing acetylene at rates of injection so controlled that the ratio of reactants thus fed into the reaction is 2 moles of the hydrosulfide to 1 mole of the alkylene oxide.

5. The process of claim 2 in which the ratio of sulfide to oxirane is at least equal to unity.

6. The process of claim 3 in which the alkylene oxide is introduced into the alkanol in such a manner that the alcohol/oxirane ratio is greater than unity at all times.

7. A process for preparing 2-hydroxyethyl vinyl sulfide which comprises simultaneously reacting acetylene and ethylene oxide with a solution of sodium hydrosulfide.

8. A process for preparing 2-hydroxyethyl vinyl sulfide which comprises simultaneously reacting acetylene and ethylene oxide with a solution of potassium hydrosulfide.

9. A process for preparing 2-hydroxypropyl vinyl sulfide which comprises simultaneously reacting acetylene and propylene oxide with a solution of sodium hydrosulfide.

10. A process for preparing 2-hydroxypropyl vinyl sulfide which comprises simultaneously reacting acetylene and propylene oxide with a solution of potassium hydrosulfide.

11. A process for preparing 2-(t-butoxy)ethyl vinyl ether which comprises simultaneously reacting acetylene and ethylene oxide with t-butanol and a catalytic amount of an alkali metal alkoxide, and distilling off the product.

12. A process for preparing 2-(t-butoxyethoxy)ethyl vinyl ether which comprises simultaneously reacting acetylene and ethylene oxide with t-butanol and a catalytic amount of an alkali metal alkoxide, and distilling off the product.

13. A process for preparing 2-methoxyethyl vinyl ether which comprises simultaneously reacting acetylene and ethylene oxide with methanol and a catalytic amount of an alkali metal alkoxide, and distilling off the product.

14. A process for preparing 2-(2-methoxyethoxy)ethyl vinyl ether which comprises simultaneously reacting acetylene and ethylene oxide with methanol and a catalytic amount of an alkali metal alkoxide, and distilling off the product.

No references cited.